United States Patent [19]

Hambright

[11] Patent Number: 4,953,370
[45] Date of Patent: Sep. 4, 1990

[54] HANDICRAFT FOR PRODUCING SIMULATED NEEDLEPOINT

[76] Inventor: Perry N. Hambright, 23515 Oxnard St., Woodland Hills, Calif. 91367

[21] Appl. No.: 403,164

[22] Filed: Sep. 5, 1989

[51] Int. Cl.$^5$ .............................................. D06B 1/12
[52] U.S. Cl. ...................................... 68/213; 68/200; 401/198; 401/199
[58] Field of Search ...................... 401/198, 199, 202; 68/200, 213; 118/268

[56] References Cited

U.S. PATENT DOCUMENTS

| | | | |
|---|---|---|---|
| 2,530,234 | 11/1950 | Duncan | 401/198 |
| 3,098,374 | 7/1963 | Langston | 68/200 X |
| 3,774,231 | 11/1973 | Tullos | 401/199 X |

FOREIGN PATENT DOCUMENTS

| | | | |
|---|---|---|---|
| 248914 | 8/1966 | Austria | 401/198 |
| 462553 | 7/1928 | Fed. Rep. of Germany | 401/199 |

Primary Examiner—Philip R. Coe
Attorney, Agent, or Firm—Jack C. Munro

[57] ABSTRACT

The method and structure for producing a simulated needlepoint design which uses a marking instrument constructed to dye individual yarn loops in an array of such loops within a looped pile textile. The tip of the marking instrument includes a recessed nib which requires a single loop to extend within the recess in order for the loop to be colored by the marking instrument. A color guide is to be mounted in conjunction with the textile which denotes to the operator exactly which loops are to be dyed which colors.

3 Claims, 2 Drawing Sheets

▲ GREEN  ▽ BLUE
● YELLOW  ○ PURPLE
■ ORANGE  □ PINK

HANDICRAFT FOR PRODUCING SIMULATED NEEDLEPOINT

BACKGROUND OF THE INVENTION

The field of this invention has to do with crafts and/or hobbies and particularly to a craft of producing a design on a textile by means of a special printing process which produces a product that resembles needlepoint.

Needlepoint is a method of sewing yarn of different colors onto backing in order to produce a stitched design. This design is produced manually a stitch at a time. People that are engaged in the craft of needlepoint must be very patient and have available sufficient time to produce the resulting stitched design, the results of such tedious work is admired by a great number of people. Even a novice can easily appreciate the amount of time and effort that has been expended in the making of needlepoint. These decorative designs get to be complex and constructed from a wide variety of different colors and are most attractive in appearance.

Many individuals admire needlepoint. However, these individuals do not have the time or the patience to construct designs from needlepoint. Additionally, a certain amount of manual dexterity is required to do needlepoint. Elderly individuals who may have somewhat advanced arthritis are not able to have sufficient manual dexterity to do needlepoint even though that individual has the time and the patience required.

SUMMARY OF THE INVENTION

The method and the structure of the present invention is designed for individuals who enjoy crafts and love the look of needlepoint but would like a simpler way and less time consuming way to accomplish the same appearance as needlepoint.

The method and apparatus of the present invention utilizes the principle of dying a design onto a special, ready-made fabric that has a surface stitch arrangement similar to needlepoint. Following a special pattern, each stitch in the fabric is individually dyed utilizing a special marking instrument which is held like a pen. The fabric is mounted in a frame in a fixed position. The fabric is a sturdy material sometimes called grospoint. The fabric is of a neutral color, such as white, and is composed of rows of small, uniform loop stitches placed tightly together. Each particular decorative design is made into a special pattern. This pattern is in the form of a color guide which lays over the fabric and indicates to the user, by way of special symbols, which stitch is to be dyed which color in order to produce that particular design. If the individual precisely follows the pattern's coloring arrangement while dying stitches, with the special marking instruments, a design will be produced which closely resembles needlepoint. Each of the marking instruments are identical with the exeption that each contains and marks a different color. The special tip of each marking instrument is comprised of a wick nib that is recessed inside a shallow sleeve where a single yarn loop enters and is hence individually colored with dye.

One of the primary objectives of the present invention is to produce a multicolored intricate design on a fabric in substantially less time than producing the same multicolored design by the use of needlepoint while closely duplicating the look and quality of needlepoint.

Another objective of the present invention is to construct a craft, either in kit form or open stock, which can be manufactured and sold at an inexpensive price thereby making the craft available to almost everyone regardless of economical status.

DETAILED DESCRIPTION OF THE SHOWN EMBODIMENT

Figure 1:
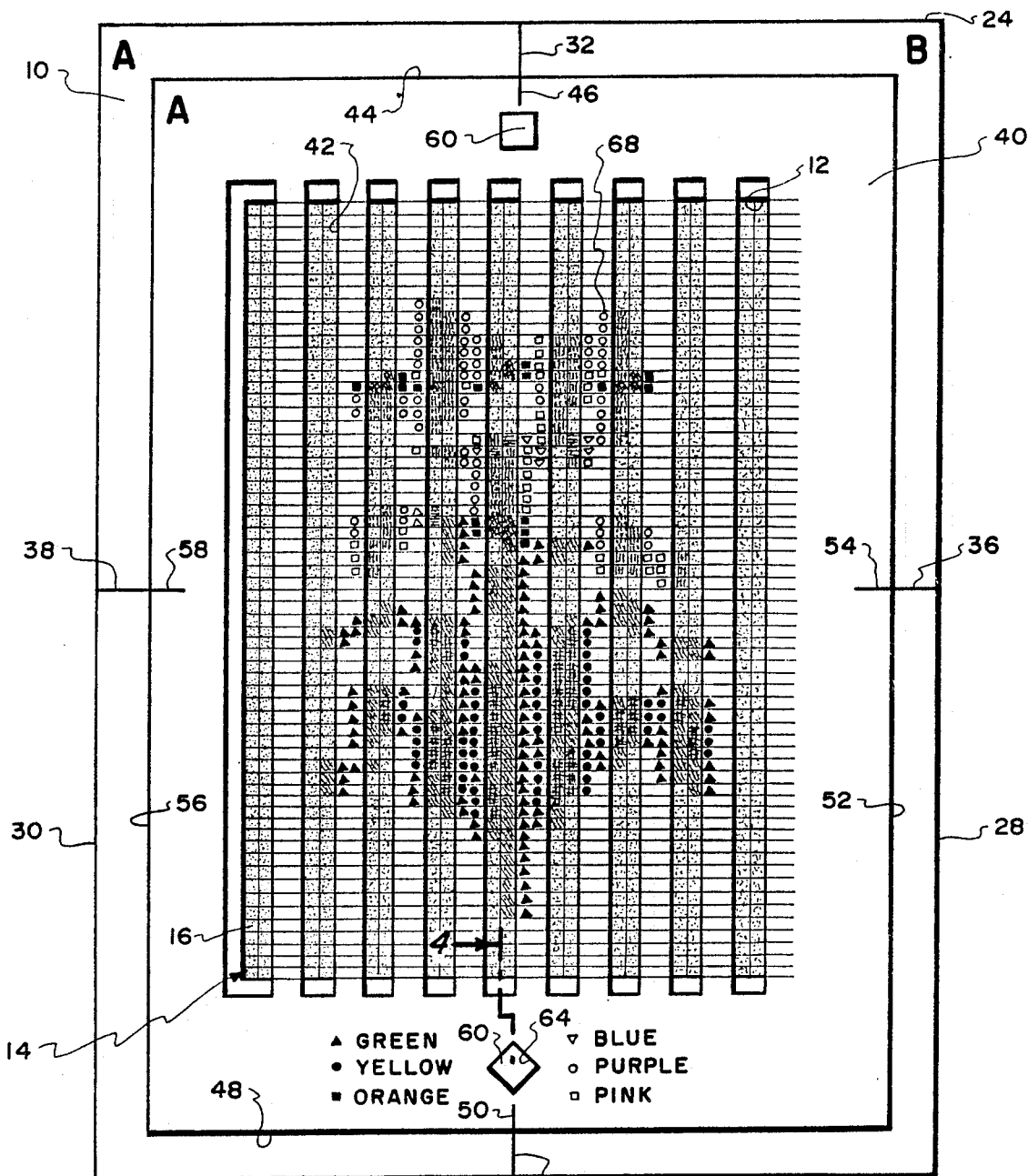
FIG. 1 is a top plan view of the structure of the present invention used to produce the simulated needlepoint showing the looped yarn textile fixedly mounted within a frame and the color guide being placed over the textile with side A showing.
Figure 3:
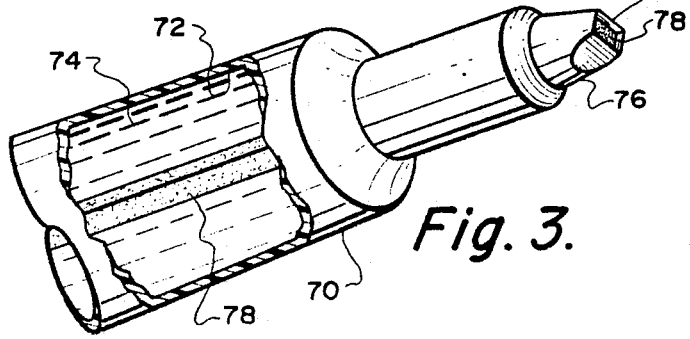
FIG. 3 is an isometric view of the frontal section of the marking instrument utilized in conjunction with the apparatus of the present invention.
Figure 4:
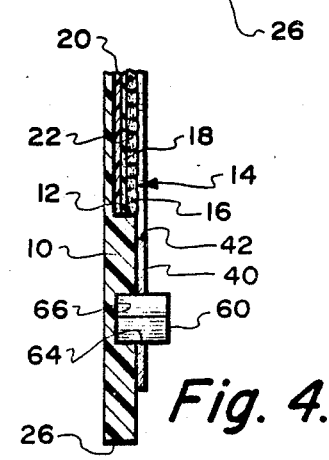
FIG. 4 is a cross-sectional view taken along line 4—4 of FIG. 1.
Figure 2:
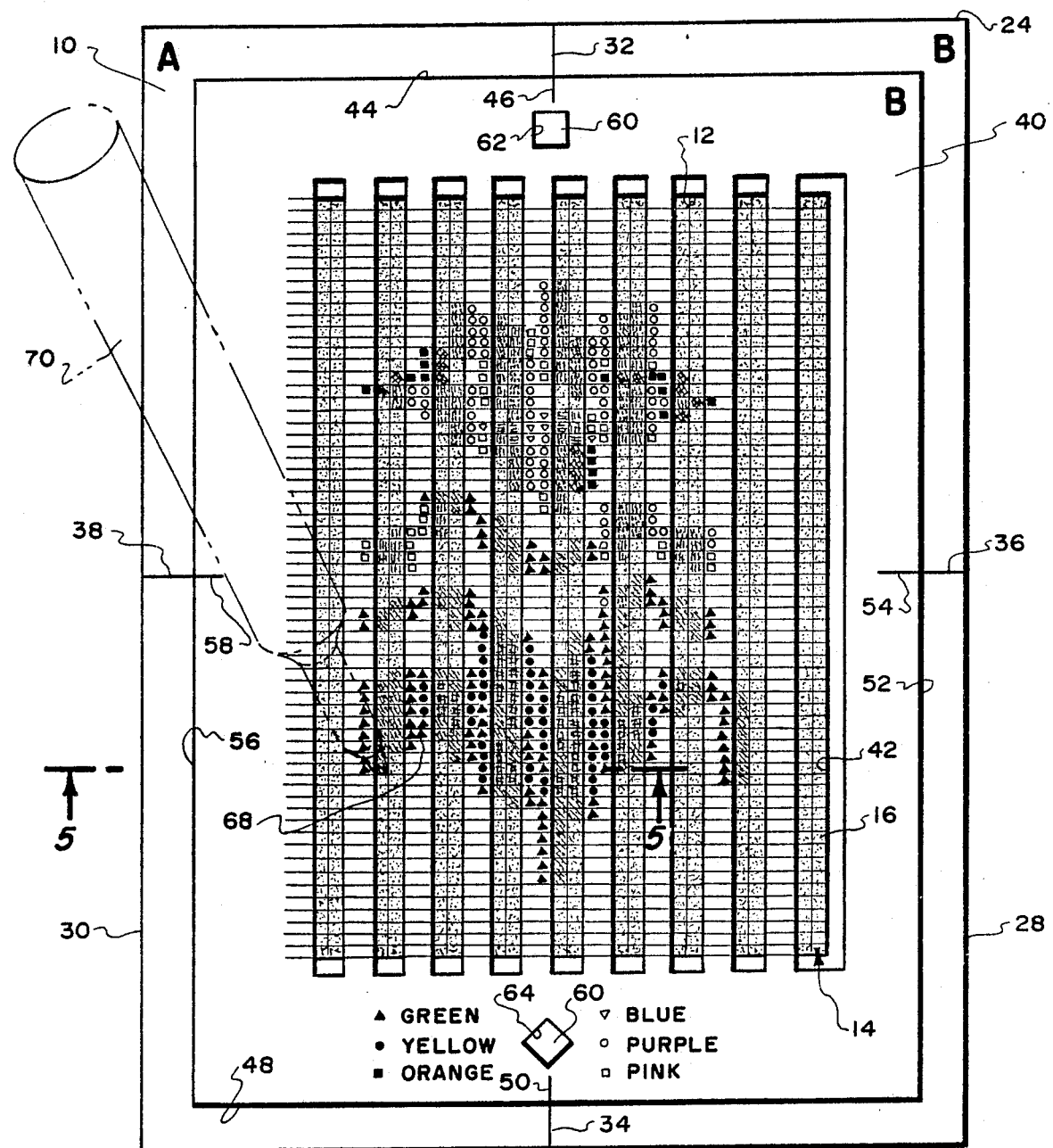
FIG. 2 is a view similar to FIG. 1 but with side B (the reverse side) being exposed.
Figure 5:
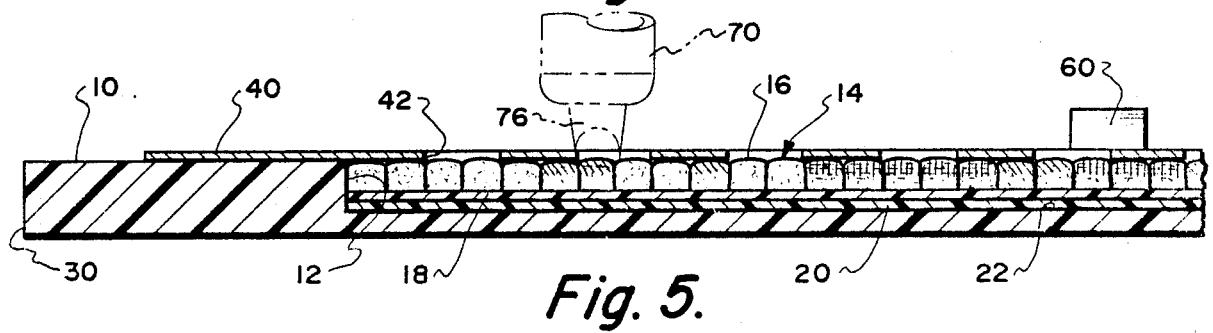
FIG. 5 is a cross-sectional view taken along line 5—5 of FIG. 2.

The process of producing simulated needlepoint of this invention uses a special "squaring" frame 10 which is of a certain size such as nine inches by twelve inches. This frame 10 is constructed of sheet material and is of sufficent thickness to define a central enlarged cutout area 12. It is to be noted that the frame 10 is basically rectangular and is planar in cofiguration. Also, the cutout area 12 is rectangular. However, it is considered to be within the scope of this invention that any configuration could be utilized. However, generally, a rectangular or square configuration is preferred. A typical material of construction for the same 10 could be a plastic or heavy cardboard paper.

A piece of textile 14 is to be located within the cutout area 12 conforming exactly in size to the cutout area 12. This textile (or fabric) is a sturdy ready-made material sometimes called grospoint. It is constructed pure white in color and its upper surface has a general overall appearance of hand produced needlepoint. This general overall appearance constitutes precise parallel rows of small, uniform yarn loop stitches 16 which are placed tightly together forming a grid pattern. These loop stitches 16 are woven onto a backing 18. The combination of the backing 18 and the loop stitches 16 resembles a conventional low pile, tightly woven, carpet. The approximate height of each of the yarn loop stitches is one-eighth of an inch.

Applied to the floor surface 22 of the cutout area 12 is layer of adhesive 20. This adhesive 20 is to be used to fixedly position the textile 14 onto the floor surface 22 of the cutout area 12. The adhesive 20 is non-hardening. By the application of a small amount of manual force, the textile 14 can be removed from the floor 22. This removal would be necessary after the desired design has been completed if to be used other than as framed wall decor. The textile 14 is cut between the loop stitches 16 to the exact size of cutout area 12. When textile 14 is placed inside cutout area 12 it is adhered by adhesive 20 and is, due to its snug fit, automatically squared so that the stitches 16 are re-aligned from any slight stretching or skewing of the textile 14. This squaring of the textile 14 is important to the process and will be explained further on in this specification.

The frame 10 has a top edge 24, a bottom edge 26, a right side edge 28 and a left side edge 30. The mid-point of the top edge 24 is marked by means of line 32 which is located on the upper surface of the frame 10. There is also a line 34 inscribing the mid-point of the bottom edge 26. In a similar manner, there is a line 36 noting the location of the precise mid-point of the right edge 28. Also, there is a line 38 noting the precise mid-point of the left edge 30.

Inscribed in the upper left hand corner of the frame 10 is the alphabetical letter A. In the upper right hand corned of the frame 10 there is the alphabetical letter B. The purposes of the letters A and B will be explained further on in this specification.

There is to be utilized a color location guide 40 in conjunction with the textile 14. This color location guide 40 is formed of sheet material with generally a plastic or thin cardboard paper being preferred. The color guide 40 includes a mass of elongated spaced-apart openings 42. It is to be noted that there are nine in number of openings 42 being shown. However, the number of these openings could be increased or decreased without departing from the scope of this invention. The width of each opening 42 is precisely equal to two vertical columns of yarn loops 16. The spacing between each directly adjacent pair of openings 42 is also exactly equal to two vertical columns of yarn loops 16.

On the upper surface of the color guide 40, in the top left hand corned, there is a letter A which is similar to the letter A in the upper left hand corner of the frame 10. The color guide 40 is to be located on the textile 16 and the openings 42 will uncover precisely one-half of the area of the textile 16. The letter A on the color guide 40 is oriented directly adjacent the same letter on the frame 10. The top edge 44 of the color guide 40 has a line 46 precisely marked at the mid-point of the top edge 44.

The user is to be sure that the line 46 is in alignment with the line 32. Within the bottom edge 48 of the color guide 40 there is inscribed a line 50 at the precise mid-point of the bottom edge 48. The user is to also make sure that the line 50 aligns precisely with the line 34. In a similar manner, the right side edge 52 of the color guide 40 includes a line 54 located at the precise mid-point of the right edge 52. The left edge 56 includes a line 58 located at the precise mid-point of the left edge 56. The user is to make sure that line 54 aligns with line 36 and line 58 aligns with line 38.

To make sure that this alignment is maintained, there is to be utilized a pair of square pins 60. These pins 60 are identical. One pin 60 is to be located within a square configuration opening located adjacent the top edge 44. This square configuration opening is provided by a square hole 62 formed within the color guide 40 and a similar square recess (not shown) formed within frame 10. Adjacent the bottom edge 48, the remaining pin 60 connects with a diamond shaped opening which is formed by an aligned pair of holes 64 formed in the color guide 40 and recess 66 formed in the frame 10.

The pin 60 can be removed and the color guide 40 turned over with the letter B on the color guide 40 now being located directly adjacent the letter B on the frame 10. When in this position, the openings 42 will expose what was previously covered by the spaced areas in the formed position. As a result, the remaining one-half of the textile is uncovered. This means that by utilizing the color guide 40 and turning such over and utilizing both sides A and B of the color guide 40, the entire area of the textile 14 will be exposed through the openings 42 exactly one-half at a time. Due to the configuration of the pins 60, the color guide 40 can only be flipped over left to rigid and not top to bottom. This is a failsafe against the possibility of the user placing the color guide 40 incorrectly over the textile 14.

Located in the spacing between directly adjacent openings 42 and also along the outer edges of the right opening 42 and the left hand opening 42, will be a series of identifying indicia 68. This identifying indicia 68 takes the form of different symbols with there being a solid triangle and an open triangle, a solid circle and an open circle, a solid square and an open square. Directly adjacent the bottom edge of the color guide 40 it can be seen that the solid triangle indicates "green", the open triangle indicates "blue", the solid circle indicates "yellow", the open circle indicates "purple", the solid square indicates "orange", and the open square indicates "pink". It is to be understood that different colors could be utilized and different types of symbols could be used. Also, the number of the symbols could be increased or decreased. Each individual symbol is located directly adjacent a specific yarn loop 16 that is to assume the color that symbol represents. It is for this reason that textile 14 must be squared inside cutout area 12 and that color guide 40 be aligned to textile 14 so that all identifying indicia 68 line up perfectly adjacent to all loop stitches 16. Therefore, it can be seen that using the color guide 40 and when all indicated yarn loops 16 are colored, a particular design will be created on the textile 14 that will give the appearance of being actual needlepoint. When the design is completed, it is to be understood that the color guide 40 is to be removed and will normally be discarded, saved or reused. Also, as previously mentioned, the textile 14 can be removed from the frame 10.

In order to color each of the yarn loops 16, there is utilized a color marking instrument 70. The body of this instrument 70 includes dye reservoir 72 within which is located a quantity of a non-toxic dye 74.

The marking instrument 70 has a rectangular shaped tip 76. Supported interiorly of the tip 76 is a wick 78. The typical material of construction for the wick would be a felt or fiber nib. The wick 78 is to extend within the reservoir 72 and is to function to absorb a quantity of the dye 74. The wick 78 is fixedly secured to the interior wall of the tip 76. The outer end of the wick 78 is noted to be recessed from the outer edge 80 of the tip 76. A typical recess would be about a sixteenth of an inch. The rectangular shaped outer edge 80 is made up of four in number of thin walls that surround the wick 78 and are what forms the recess of the tip 76. The outer edge 80 is sharp so that it passes easily between individual yarn loops 16 and the entire area of the recess is the exact size and shape of one yarn loop 16.

It is to be understood that there will be a marking instrument 70 containing a dye corresponding to each color that is used in the design. In the model shown in the drawings, there will be six in number of different marking instruments 70.

A particular instrument 70 of a particular color is to locate the recess of tip 76 in conjunction with the specific yarn loop 16 that is to be dyed that particular color. The sharp edge 80 facilitates the insertion in connection with a particular yarn loop 16. The yarn loop 16 that is to be dyed will extend within the recess of the tip 76 and come in contact with the wick 78. The particular dye that impregnated the wick 78 will then flow into that specific yarn loop 16. The thin walls formed by sharp edge 80 then serve as barriers and prevent the unwanted dying of surrounding yarn loops 16. This dye printing procedure is to be continued for each marking instrument 70 for each color. When all indicated yarn loops 16 have been dyed from both sides of color guide 40, the resulting design on the textile 14 will be produced.

It is considered to be a possibility that the user could make a mistake and apply the wrong color to the wrong location. If such occurs, there could be utilized an eraser instrument similar to instrument 70 with the exception that the eraser instrument does not include a dye but would include a dye eradicator solution. Application of the eradicator to the miscolored yarn loop 16 will result in removal of that dye and, after drying, the correct color could then be applied to that yarn loop 16.

It is considered to be within the scope of this invention that instead of individually applying a given color to a single yarn loop 16, that it may be possible to use several applicator blocks upon which are mounted a plurality of tips 76 and wicks 78. These wicks 78 could be all of the same color on one block. The location on the block of the various tips 76 would be according to a given pattern as to which yarn loops 16 were to be dyed that color. In other words, for one specific color to be dyed, there is arranged on the block the tips 76 according to the desired color arrangement for all those loop stitches 16 to be dyed at once. This procedure could be repeated using other blocks for each and every different color to be applied in that particular design. The net result is that the design would be produced in a much quicker manner and this technique may be utilized if the design were to be produced on a mass production basis for sale as a finished. Another method to achieve a more rapid production of the design would be to use a computer driven plotter device upon which is mounted marking instruments 70. The plotter would draw a single dot wherever a yarn loop 16 is to be dyed according to the pattern which is read by the computer. A marking instrument 70 would be replaced, when all of that color is completed, with one of a new color and the process continued that way until the design is complete.

What is claimed is:

1. In combination with a textile, said textile being formed of a plurality of yarn loops located in a closely spaced array, a color marking instrument for transferring a particular color of dye onto a single said yarn loop, said color marking instrument comprising:

a casing adapted to be grasped by the hand of a human being, said casing being hollow forming an internal chamber, said internal chamber to function as a reservoir for a quantity of a dye, said casing having a tip, said tip terminating in an outer edge, said tip having an opening, the transverse size of said opening being slightly larger than the transverse cross-sectional size of each said yarn loop with all said yarn loops having substantially the same cross-sectional size;

a wick mounted within said opening, a portion of said wick extending into said reservoir and another portion of said wick being mounted within said opening, said portion of said wick within said opening being spaced inwardly of said outer edge becoming a recessed marking nib, whereby a said loop must enter said opening to contact said to wick to pick up the color of the dye from said reservoir which has impregnated said wick.

2. The combination as defined in claim 1 wherein:
the cross-sectional configuration of said tip being polygonal.

3. The combination as defined in claim 2 wherein:
said outer edge being sharp enough to facilitate entry of said tip over a single said yarn loop shielding said wick from contacting any other said yarn loop within said plurality of yarn loops.

* * * * *